United States Patent
Nakamaru et al.

(10) Patent No.: US 6,467,961 B2
(45) Date of Patent: Oct. 22, 2002

(54) LUBRICATING COATING COMPOUND, SLIDING STRUCTURE COMBINING TWO SLIDING MEMBERS IN WHICH LUBRICATING COATING COMPOUND IS APPLIED TO ONE OF THE SLIDING MEMBERS, AND SLIDE BEARING APPARATUS USING THE SAME

(75) Inventors: Takashi Nakamaru, Fujisawa (JP); Yoshiaki Yamamoto, Fujisawa (JP); Namiko Kaneko, Fujisawa (JP)

(73) Assignee: Oiles Corporation, Tokyo (JP)

( * ) Notice: Subject to any disclaimer, the term of this patent is extended or adjusted under 35 U.S.C. 154(b) by 18 days.

(21) Appl. No.: 09/833,655

(22) Filed: Apr. 13, 2001

(65) Prior Publication Data

US 2001/0039305 A1 Nov. 8, 2001

Related U.S. Application Data

(62) Division of application No. 09/262,349, filed on Mar. 4, 1999, now Pat. No. 6,245,836.

(30) Foreign Application Priority Data

Sep. 12, 1997 (JP) .............................. 9-267838
Apr. 22, 1998 (JP) .......................... 10-112497
Sep. 29, 1998 (JP) .......................... 10-274776

(51) Int. Cl.[7] .................. F16C 33/10; F16C 17/00; F16C 29/00; F16C 31/00; F16C 7/00

(52) U.S. Cl. ............... 384/13; 384/7; 384/155; 384/322; 384/445; 523/428; 523/429; 523/461; 523/465; 523/466; 524/478; 524/588; 524/609; 524/763; 524/838; 525/403; 525/407; 525/474; 525/476

(58) Field of Search .......................... 523/428, 429, 523/461, 465, 466; 524/478, 588, 609, 763, 838; 525/403, 407, 474, 476; 384/13, 7, 155, 322, 445

(56) References Cited

U.S. PATENT DOCUMENTS 4,239,632 A    12/1980  Baile
5,427,698 A     6/1995  Hirokawa et al.

FOREIGN PATENT DOCUMENTS

JP    02155958    6/1990
JP    06009979    1/1994
JP    2629011     7/1997
RU    2014551     6/1994

Primary Examiner—Patrick D. Niland
(74) Attorney, Agent, or Firm—Nixon & Vanderhye

(57) ABSTRACT

A lubricating coating compound used for forming a thermosetting synthetic resin lubricating film, wherein a resin composition composed of an epoxy resin, a curing agent, a reactive silicone oil with an epoxy group, and a triazinethiol is dissolved in an organic solvent, wherein if the sum of the epoxy resin and the curing agent is set to 100 parts by weight, the sum of the reactive silicone oil with an epoxy group and the triazinethiol is 2 to 30 parts by weight.

15 Claims, 5 Drawing Sheets

LUBRICATING COATING COMPOUND, SLIDING STRUCTURE COMBINING TWO SLIDING MEMBERS IN WHICH LUBRICATING COATING COMPOUND IS APPLIED TO ONE OF THE SLIDING MEMBERS, AND SLIDE BEARING APPARATUS USING THE SAME

This is a division of application Ser. No. 09/262,349, filed Mar. 4, 1999, now U.S. Pat. No. 6,245,836, the entire content of which is hereby incorporated by reference in this application.

BACKGROUND OF THE INVENTION

1. Field of the Invention

The present invention relates to a lubricating coating compound for a sliding member, a sliding structure combining two sliding members respectively having sliding surfaces held in sliding contact with each other, wherein the lubricating coating compound is applied to at least one of the sliding surfaces, and a slide bearing apparatus using the sliding structure.

2. Description of the Related Art

As lubricating coating compounds, various types are known including (i) one in which an oil-based composition is applied by spraying or the like and is used in a wet state, (ii) one in which after a coating is formed, a solvent is allowed to volatilize, and the coating is used as a dry film, and (iii) one in which a coating is allowed to cure under the normal temperature or on heating and is used as a cured film.

The lubricating coating compounds (i) and (ii) are used in the form of one kind of lubrication in which a lubricating composition is supplied to opposing surfaces of two members which slide with respect to each other on their opposing surfaces.

Namely, the lubricating film formed by each of these lubricating coating compounds (i) and (ii) is not formed in the two sliding members themselves, but is, in a word, interposed between their opposing surfaces. Accordingly, when such a lubricating film has been consumed, the lubricating film can be formed again by performing similar spraying or the like.

In contrast, the lubricating coating compound (iii) is different in kind from the lubricating coating compounds (i) and (ii). Namely, the lubricating coating compound (iii) forms a portion or portions of either one or both of the two sliding members, i.e., a surface layer of the sliding member is formed.

It is desired that this surface layer, i.e., the film which forms the sliding surface, excel in the mechanical strength, have good adhesion to a substrate, should not be damaged by an external force or worn out easily during sliding, or should not exfoliate from the substrate.

Here, the imparting of lubricity to the film, on the one hand, and the mechanical strength of the film and its adhesion to the substrate, on the other hand, are in an apparently incompatible relationship, and there is a problem in that if an attempt is made to improve the lubricity, the strength and adhesion inevitably decline.

In addition, in a combination of two sliding members held in sliding contact with each other, in a case where one sliding member, particularly its sliding surface, is formed of a synthetic resin, a metallic sliding member, such as one formed of steel, is generally used as the mating member. However, there are cases where the mating member itself is also formed of a synthetic resin or at least its sliding surface is formed of a synthetic resin in view of various purposes and needs, i.e., for the purposes of rust prevention, chemical resistance, electrical insulation, light weight, and a requirement in design.

As such an example, it is possible to cite, among others, a combination of a synthetic resin bearing and a steel-made shaft provided with a synthetic resin coating, a combination of gears each formed of a synthetic resin, and a control cable made up of a combination of a synthetic resin pipe and a wire rope which is coated with a synthetic resin, is inserted therein, and is adapted to be pushed and pulled (undergo reciprocating sliding) or undergo rotational sliding.

However, in the case of the combination of the sliding members formed of a synthetic resin, even in the case of a tetrafluoroethylene resin which is known to have a low coefficient of friction, it is difficult to lower the coefficient of kinetic friction to 0.1 or less in sliding under a dry frictional condition.

On the other hand, in a slide bearing apparatus having the function of allowing the displacement of a structure to escape through sliding in response to earthquake motion, if the coefficient of friction acting on its sliding surface is large, sliding displacement fails to be performed desirably, and effective vibration isolation fails to be demonstrated, so that it is desired that the frictional resistance at its sliding surface should be low.

Furthermore, with the slide bearing apparatus, since the apparatus does not operate other than when a force is applied thereto due to an earthquake or the like, in order to obtain a stable vibration isolation effect, it is required that the frictional resistance during operation should be stable, i.e., the change over time of the coefficient of static friction should be small. Namely, it is required that, in addition to the fact that the coefficient of kinetic friction should be low, the coefficient of static friction should also be low and stable.

However, in the case of the combination of sliding members formed of a synthetic resin, the coefficient of static friction generally shows a value which is not less than two times the coefficient of kinetic friction. Furthermore, in cases where the apparatus is under load and is normally not operated, the coefficient of static friction tends to become gradually large due to microscopic creep ascribable to the contact of the two members over a long period of time.

Accordingly, although both the coefficient of static friction and the coefficient of kinetic friction can be lowered by applying a lubricant such as grease or oil to the sliding surfaces, the lubricant comes to be discharged from the sliding surfaces over short periods of time, and its effect is lost. Moreover, the coefficient of friction gradually rises due partly to the effect of the solidification or deterioration of the lubricant over time.

SUMMARY OF THE INVENTION

The present invention has been devised upon finding that it is extremely effective to compound with an epoxy resin, i.e., a base resin, a reactive silicone oil which cures by forming a three-dimensional network structure in the presence of a crosslinking agent, a triazinethiol which is a crosslinking agent for this reactive silicone oil and has the function of modifying the substrate surface as a surface suitable for bonding, and, as necessary, a nonreactive silicone oil in addition to them.

Accordingly, it is an object of the present invention to provide a lubricating coating compound which is used for forming a thermosetting synthetic resin lubricating film, forms its surface layer integrally with a substrate, and exhibits an excellent low-friction characteristic, thereby overcoming the above-described drawbacks of the conventional art.

Another object of the present invention is to provide a sliding structure combining two sliding members which exhibits a coefficient of static friction and a coefficient of kinetic friction that are stable and low, and which causes low-friction sliding to take place reliably and effectively when sliding is required, as well as a slide bearing apparatus using the sliding structure.

In accordance with a first aspect of the present invention, there is provided a lubricating coating compound used for forming a thermosetting synthetic resin lubricating film, wherein 100 parts by weight of an epoxy resin, 2 to 30 parts by weight of a reactive silicone oil with an epoxy group, and at least W part by weight of a triazinethiol calculated by the following relation are dissolved in an organic solvent:

$$W = \text{(amount of epoxy resin used 100)} \times \frac{S}{E_1} + \text{[amount of reactive silicone oil with an epoxy group used (from 2 to 30)]} \times \frac{S}{E_2}$$

where $E_1$ is an epoxy equivalent of the epoxy resin used, $E_2$ is an epoxy equivalent of the reactive silicone oil with an epoxy group used, and S is the number of grams of the triazinethiol containing 1 gram-equivalent of mercapto groups —SH.

Namely, in accordance with the first aspect of the present invention, there is provided a lubricating coating compound used for forming a thermosetting synthetic resin lubricating film, wherein 100 parts by weight of an epoxy resin, 2 to 30 parts by weight of a reactive silicone oil with an epoxy group, and a triazinethiol in an amount sufficient to cause at least crosslinking of the epoxy groups of these two components are dissolved in an organic solvent.

In accordance with another aspect of the present invention, for the purpose of modifying the aforementioned synthetic resin lubricating film, there is provided the lubricating coating compound used for forming a thermosetting synthetic resin lubricating film, wherein at least one of 2 to 30 parts by weight, preferably 2 to 15 parts by weight of at least one of inorganic and organic filler powders and 0.5 to 5 parts by weight of at least one of oil and a wax-like substance is further dissolved or dispersed in the organic solvent.

Further, there is provided the lubricating coating compound used for forming a thermosetting synthetic resin lubricating film, wherein, of the aforementioned components of the composition, part of the triazinethiol is replaced by curing agent such as a polyamine, an acid anhydride, a phenolic resin, a polyamide resin, or a mercaptan-based compound.

Furthermore, in the lubricating coating compound used for forming a thermosetting synthetic resin lubricating film in which the resin composition composed of an epoxy resin, a curing agent, a reactive silicone oil with an epoxy group, and a triazinethiol are dissolved in an organic solvent, if a sum of the epoxy resin component and the curing agent component is set to 100 parts by weight, a sum of the reactive silicone oil with an epoxy group and the triazinethiol is from 2 to 30 parts by weight, preferably 2 to 15 parts by weight. Here, if the sum of the epoxy resin and the curing agent is set to 100 parts by weight, 2 to 10 parts by weight of a nonreactive silicone oil is preferably compounded in the composition.

In addition, in accordance with another aspect of the present invention, there is provided a sliding structure combining two sliding members including a first sliding member and a second sliding member which are held in into sliding contact with each other on sliding surfaces thereof, wherein the sliding surface of the first sliding member is formed of a lubricating film made of a thermosetting synthetic resin, and the sliding surface of the second sliding member is formed of a synthetic resin, the lubricating film being a film of a composition composed of an epoxy resin, a reactive silicone oil with an epoxy group, and a triazinethiol.

In accordance with still another aspect of the present invention, there is provided a slide bearing apparatus comprising the aforementioned sliding structure which causes sliding to take place during an earthquake so as to exhibit a vibration isolating action.

In accordance with the present invention, it is possible to provide a lubricating coating compound for forming a synthetic resin film, in which its surface layer is formed integrally with the substrate, and which exhibits an excellent sliding characteristic.

In addition, in accordance with the present invention, it is possible to provide a sliding structure combining two sliding members which exhibits a coefficient of static friction and a coefficient of kinetic friction that are stable and low, and which causes low-friction sliding to take place reliably and effectively when sliding is required, as well as a slide bearing apparatus using the sliding structure.

Hereafter, a description will be given of embodiments and examples of the present invention. It should be noted that the present invention is not limited to these embodiments and examples.

Embodiments

Figure 1:
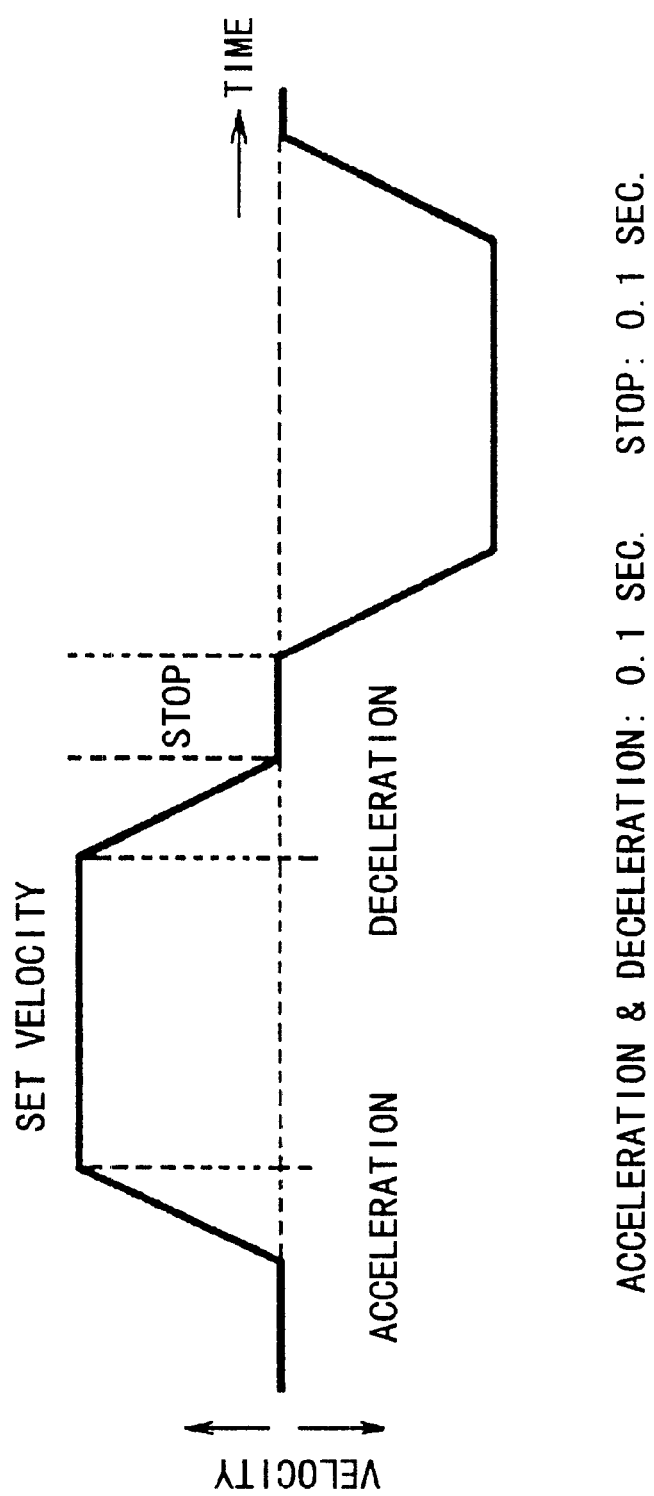
FIG. 1 is a model of the waveform of the test velocity of a reciprocating test machine used in the test of the present invention.

As an epoxy resin, it is possible to use conventionally known epoxy resins, and it is possible to cite, for example, glycidyl ether-type epoxy resins such as bisphenol A-type epoxy resin, bisphenol F-type epoxy resin, phenolic novolak-type epoxy resin, cresol novolak-type epoxy resin, and brominated bisphenol A-type epoxy resin, as well as glycidyl ester-type epoxy resins, glycidyl amine-type epoxy resins, and cycloaliphatic epoxy resins. These epoxy resins are used singly or in combination of two or more kinds. Specifically, it is possible to cite a liquid- or solid-type epoxy resin "Epikote (tradename)" of the bisphenol A type made by Yuka Shell Epoxy Kabushiki Kaisha. The epoxy resin constitutes the matrix of the synthetic resin film of the present invention, and also functions as an adhesive with respect to a substrate.

The reactive silicone oil with an epoxy group is a silicone oil in which a part of the methyl group of dimethyl polysiloxane is substituted by a functional group containing an epoxy group. For example, the reactive silicone oil with an epoxy group is expressed by the following Formula (1), (2), or (3):

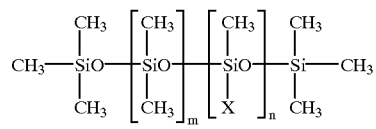
(1)

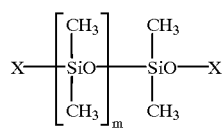
(2)

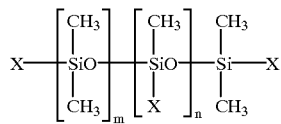
(3)

In Formulae (1), (2), and (3), X represents an epoxy-containing group of such as the following Formula (4), (5), (6), or (7); m is an integer from 5 to 10,000; and n is an integer from 2 to 100.

(4)

(5)

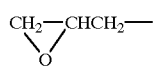
(6)

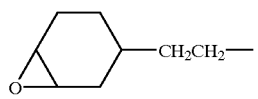
(7)

Among the aforementioned reactive silicone oils having an epoxy group, silicone oils of the following Formulae (8) and (9) are preferable.

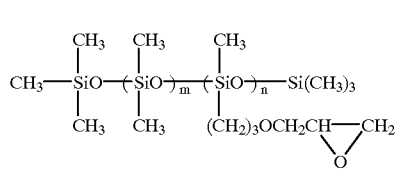
(8)

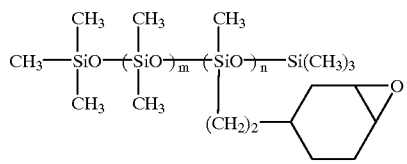
(9)

In Formulae (8) and (9), m is an integer from 5 to 10,000, and n is an integer from 2 to 100.

The reactive silicone oil with an epoxy group is an oily substance having a linear structure, but exhibits a three-dimensional network structure on reaction with a triazinethiol and cures. This three-dimensional network structure is no longer oily, but retains lubricity, and this three-dimensional network structure improves the rigidity of the synthetic resin film formed by the lubricating coating compound of the present invention, and also serves as a retainer for retaining a nonreactive silicone oil.

In one form of the present invention, the reactive silicone oil with an epoxy group begins to exhibit its effect if it is compounded by approximately 1 part by weight with respect to 100 parts by weight of the epoxy resin, and its effect becomes noticeable if it is compounded by 2 parts by weight or more. However, if it is compounded by 30 parts by weight, the decline in the strength of the film becomes large, but the reactive silicone oil at this compounding amount can be used effectively under certain sliding conditions. The most preferable compounding amount is 5 to 20 parts by weight with respect to 100 parts by weight of the epoxy resin.

The triazinethiol is represented by the following Formula (10):

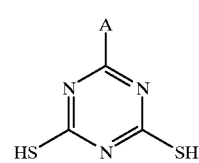
(10)

In Formula (10), A is a mercapto group —SH, a dibutyl amino group —N(C$_4$H$_9$)$_2$, or an anilino group —NHC$_6$H$_5$.

This triazinethiol functions as a crosslinking agent for the reactive silicone oil with an epoxy group as described above, and converts the reactive silicone oil with an epoxy group into a three-dimensional network structure. In addition, since the triazinethiol also has the function of curing the epoxy resin, the triazinethiol can be used as a substitute for the curing agent which will be described later.

Conventionally, this triazinethiol is also used as a crosslinking agent particularly for rubber and vinyl chloride, as a bonding agent for bonding a metal and rubber, and as a surface treating agent for a metal, and is extremely rich in reactivity. In the present invention, it is considered that, at the time of formation of the synthetic resin film, the triazinethiol reacts with the epoxy resin as well and functions to be firmly bonded to the three-dimensional network structure of the reactive silicone oil with an epoxy group, and the triazinethiol concurrently reacts with the substrate surface as well and functions to improve the bond strength between the substrate and the film.

The compounding amount of the triazinethiol is an amount by which if the curing agent is not used, both of the two components used, i.e., the epoxy resin and the reactive silicone oil with an epoxy group, can be cured.

To give a more detailed description, the compounding amount W of the triazinethiol must be an amount which corresponds to the epoxy equivalent E1 of the epoxy resin and the epoxy equivalent E2 of the reactive silicone oil with an epoxy group which are used, and must be W parts by weight which is calculated by the following relation when the amount of epoxy resin used is set to 100 parts by weight:

$$W = \text{(amount of epoxy resin used 100)} \times \frac{S}{E_1} + \text{[amount of reactive silicone oil with an epoxy group used (from 2 to 30)]} \times \frac{S}{E_2}$$

where S is the number of grams of the triazinethiol containing 1 gram-equivalent of mercapto groups —SH, and the epoxy equivalent is the number of grams of the epoxy resin containing 1 gram-equivalent of epoxy groups.

This compounding amount is a value which indicates a minimum necessary amount for the proceeding of the curing reaction of the epoxy resin and the reactive silicone oil with an epoxy group used in the present invention. Accordingly, if the compounding amount is less than that value, curing does not proceed smoothly.

As described above, the triazinethiol has the function of preparing a substrate surface suitable for the bonding of the synthetic resin film through its reaction with the substrate. Microscopically, bonding occurs through the molecular film of the triazinethiol on the substrate. Moreover, this triazinethiol undergoes chemical bonding with the epoxy resin as well, and an extremely firm film is thus formed. Further, it has also been reported that this triazinethiol undergoes self-bonding and a molecular film is formed on the substrate.

Accordingly, from the above-described various perspectives the triazinethiol can be compounded in a substantially large amount in addition to the amount necessary for the curing of the epoxy resin and the silicone oil with an epoxy group.

However, as a result of various experiments it became clear that the triazinethiol which has such outstanding functions has a slight problem. This is the problem that the toughness of the cured film which is obtained declines.

It is not certain whether this is attributable to the mercapto group —SH or the length of the molecule of the triazinethiol as the curing agent, but in cases where such a point constitutes a problem as a film, it is an effective means to replace part of this triazinethiol by one of the curing agents which are used as curing agents for the epoxy resin, as will be described later. Further, it is possible to jointly use a curing accelerator such as a tertiary amine, an imidazole derivative, or boron fluoride complex salts in conjunction with such a curing agent. A maximum amount by which the part of the triazinethiol can be replaced by the curing agent can be set up to an amount necessary for allowing practically all the amount of epoxy resin used to cure.

According to one aspect of the present invention, in which the curing agent is compounded in an amount necessary for allowing practically all the amount of epoxy resin to cure, it suffices if the amount of the triazinethiol to be compounded is greater than or equal to an amount necessary for crosslinking the reactive silicone oil with an epoxy group and converting it into the three-dimensional network structure, preferably such that the weight of the triazinethiol compounded/the weight of the reactive silicone oil with an epoxy group compounded=0.03 to 1.

As for the compounding amounts of the reactive silicone oil with an epoxy group and the triazinethiol, if the sum of the epoxy resin and the curing agent is 100 parts by weight, the sum of the compounding amounts of the reactive silicone oil with an epoxy group and the triazinethiol is from 2 to 30 parts by weight, preferably from 2 to 20 parts by weight, or more preferably from 5 to 20 parts by weight. If the compounding ratio is less than 2 parts by weight, the effect of compounding cannot be obtained, and if it exceeds 30 parts by weight, the decline in the mechanical strength of the synthetic resin film is noticeable.

As the curing agent, it is possible to use conventional curing agents used for epoxy resins, and it is possible to cite, for example, polyamines, acid anhydrides, phenolic resins, polyamide resins, and mercaptan-based compounds. Further, it is possible to jointly use a curing accelerator such as a tertiary amine, an imidazole derivative, or boron fluoride complex salts in conjunction with such a curing agent.

The polyamines may include aliphatic polyamines such as diethylenetriamine and triethylenetetramine, cycloaliphatic amines such as isophorone diamine and bis(4-amino-3-methylcyclohexyl)methane, aromatic amines such as diaminodiphenyl methane, diaminodiphenyl sulfone, and methaphenylenediamine, heterocyclic amines such as aminoethyl piperazine, 3,9-bis(3-aminopropyl)-2,4,8,10-tetraoxaspiro[5.5]undecane, and dicyandiamide, and their modified compounds. As the modifying means, it is possible to modify the polyamines in the form of adducts with an epoxy resin, an ethylene oxide, a propylene oxide, acrylonitrile, or ketones. As specific examples of the aforementioned polyamines, it is possible to cite a modified aliphatic polyamine "Epikure-T (tradename)," a modified cycloaliphatic amine "Epikure-113 (tradename)," and a modified aromatic amine "Epikure-W (tradename)," all of which are made by Yuka Shell Epoxy Kabushiki Kaisha.

The acid anhydrides may include aliphatic acid anhydrides such as dodecylsuccinic anhydride and polyazelaic polyanhydride, cycloaliphatic acid anhydrides such as hexahydrophthalic anhydride, tetrahydrophthalic anhydride, and methyl nadic anhydride, aromatic acid anhydrides such as phthalic anhydride, trimellitic anhydride, and pyromellitic anhydride, and halogenic acid anhydrides such as tetrabromophtalic anhydride and HET anhydride, and a tertiary amine or an imidazole derivative is generally used as a curing accelerator. As a specific example, it is possible to cite "Epikure-134A (tradename)" made by Yuka Shell Epoxy Kabushiki Kaisha.

As the phenolic resin, it is possible to cite a novolak-type phenolic resin, and a curing accelerator is generally used jointly.

As the polyamide resin, it is possible to cite a polyamide obtained from polyamine and a dimer acid which is a dimer of an unsaturated fatty acid.

The mercaptan-based compound refers to an aliphatic polysulfide polymer having the mercapto group —SH at both ends of its molecular structural formula, and since the mercaptan-based compound itself does not react with the epoxy resin, it is necessary to jointly use the aforementioned polyamine or the tertiary amine. As a specific example of the mercaptan-based compound, it is possible to cite "CAPCURE-3800 (tradename)" made by Yuka Shell Epoxy Kabushiki Kaisha.

The compounding ratio between the epoxy resin and the curing agent is determined by the ratio between, on the one hand, the number of epoxy groups or hydroxyl groups in the epoxy resin and, on the other hand, the number of functional groups in the curing agent which react with these epoxy groups or hydroxyl groups.

For example, in a case where a polyamine is used as the curing agent, if the epoxy equivalent of the epoxy resin is set to E and the amine equivalent of the polyamine is set to A, the compounding amount is polyamine (0.8 to 1.2)×A g with respect to E g of the epoxy resin. Here, the amine equivalent is the number of grams of the polyamine containing 1 gram-equivalent of active hydrogen reacting with the epoxy group.

Accordingly, the compounding weight ratio between the epoxy resin and the curing agent changes depending on the kind of the epoxy resin used and the kind of the curing agent used, but this compounding weight ratio is set as listed below. Namely, the curing agent is compounded at the ratio shown in Table 1 with respect to E g of the epoxy resin. Here, E represents the value of the epoxy equivalent of the epoxy resin.

TABLE 1

| Kind of Curing Agent | Compounding Amount (g) With Respect to E g of Epoxy Resin |
|---|---|
| Polyamine | 10 to 200 |
| Acid anhydride | 70 to 300 |
| Phenolic resin | 90 to 150 |
| Polyamide resin | 80 to 250 |
| Mercaptan-based compound | 70 to 200 |

In addition, if a curing accelerator is jointly used, it suffices if the curing accelerator is compounded by 1 to 20 g with respect to E g of the epoxy resin.

In the present invention, nonreactive silicone oil, inorganic and organic filler powders, oil, and a wax-like substance may be compounded as necessary in addition to the aforementioned substances.

The nonreactive silicone oil which is compounded with one purpose of further lowering the coefficient of friction is a dimethyl silicone oil or a silicone oil in which a part of the methyl group in the dimethyl polysiloxane is replaced by the polyether, phenyl, alkyl, aralkyl, or fluorinated alkyl group or the like. A nonreactive silicone oil whose viscosity (25° C.) is 100 to 50,000 cSt (centistokes), or preferably 500 to 10,000 cSt, is used.

The nonreactive silicone oil is retained in the three-dimensional network structure of the reactive silicone oil with an epoxy group, and its bleadout to the sliding surface is suppressed appropriately, so that its compounding effect can be maintained over a long period of time.

The compounding amount of the nonreactive silicone oil in one example is 2 to 10 parts by weight, preferably 3 to 7 parts by weight, with respect to 100 parts by weight of the sum of the epoxy resin and the curing agent. If the compounding amount is less than 2 parts by weight, the effect on improvement of the sliding characteristic cannot be obtained, whereas if it exceeds 10 parts by weight, the mechanical strength of the synthetic resin film declines appreciably.

As inorganic and organic filler powders, it is possible to cite an inorganic powder of graphite, boron nitride, or the like and an organic powder of a fluorocarbon resin represented by the tetrafluoroethylene resin. In the case where the curing agent is compounded, the compounding amount of the inorganic or organic filler powder is set to 2 parts or more by weight in view of the compounding effect, and 30 parts or less by weight, preferably 20 parts or less by weight, more preferably 10 parts or less by weight, in view of the operating efficiency in the formation of a coating, with the sum of the epoxy resin and the curing agent set to 100 parts by weight.

The inorganic powder imparts load resistance and abrasion resistance to the film, and the organic powder supplements the self-lubricity of the film.

As the oil and the wax-like substance, it is possible to cite by way of example an oily substance such as a mineral oil, an animal or vegetable oil, a synthetic lubricating oil excluding silicone oil, and a wax-like substance such as a petroleum wax, a higher fatty acid, a salt of a higher fatty acid, and an ester of a higher fatty acid.

The oil and the wax-like substances have effects of imparting self-lubricity and contributing to low friction, and of lowering the coefficient of kinetic friction in a light-load region, in particular, if they are compounded by 0.5 part or more by weight. If they are compounded in excessively large amounts, they deteriorate the mechanical strength and adhesion, but it was found that if they are compounded by 5 parts or less by weight, their effect on the mechanical strength and adhesion is very small.

As the solvent used in the preparation of the lubricating coating compound, it is possible to cite an organic solvent, e.g., ketones such as acetone, methyl ethyl ketone, methyl isobutyl ketone, and cyclohexanone, alcohols such as isopropyl alcohol and n-butanol, aromatic hydrocarbon-based solvents such as toluene and xylene, and tetrahydrofuran. These solvents may be used singly or as a mixture thereof.

After the epoxy resin, the reactive silicone oil with an epoxy group, and, as necessary, the nonreactive silicone oil, the organic and inorganic filler powders, oil, and the wax-like substance are dissolved or dispersed in the organic solvent, the triazinethiol and, as necessary, the curing agent are dissolved therein, or after the epoxy resin is dissolved in the organic solvent, the reactive silicone oil with an epoxy group, the triazinethiol, and, as necessary, the curing agent, the nonreactive silicone oil, the organic and inorganic filler powders, oil, and the wax-like substance are dissolved or dispersed therein, thereby preparing a lubricating coating compound whose solid content is 30 to 40 wt. %, i.e., a preferable concentration in view of its handling, and whose viscosity at ordinary temperature is 100 to 200 cSt or thereabouts.

As a means of applying the lubricating coating compound of the present invention, it is possible to employ such coating-forming means as brushing and spraying which are generally performed in the conventional practice.

If the substrate material used for the formation of the coating is a metal, its coating surface is subjected in advance to pretreatment by ordinary shot blasting, degreasing, or the like, whereas, in the case of a material such as a synthetic resin or a ceramic, its coating surface is smoothened and cleaned in advance.

As the curing conditions after formation of the coating, it is possible to adopt various conditions depending on what curing agent is used. To cite an example in which a cycloaliphatic amine is used as the curing agent in addition to the triazinethiol, a desired cured film can be obtained if U the solvent is volatilized by natural drying or predrying at 80° C. for about 30 minutes after formation of the coating, and if baking is subsequently performed at 180° C. for 30 minutes.

The thickness of the film, which was obtained by using the lubricating coating compound with a solid content of 35 wt. %, by spraying it onto a steel plate, and by effecting curing by baking it under the aforementioned conditions, was approximately 30 μm.

A thinner film can be obtained if spraying is effected by decreasing the solid content, whereas a thicker film can be obtained by performing multi-coating.

Thus, a film with a thickness of 5 to 100 μm can be easily obtained, but a film with a thickness of 10 to 50 μm, particularly 20 to 40 μm, is preferable as the lubricating film. If the film thickness is less than 5 μm, the homogeneity of the film is impaired, and the durability of the lubricating film declines. On the other hand, if the film thickness exceeds 100 μm, the mechanical strength of the film is impaired, and the load resistance as the sliding member declines.

The film thus obtained was found to be firmly joined to the substrate, and no exfoliation of the film was noticed in a cross-cut test.

In addition, the compression shear strength, which was measured to evaluate the adhesive strength of the film, was 30 to 100 kgf/cm$^2$, and was substantially greater than the range of 20 to 30 kgf/cm$^2$ which is generally said to present no problem as the compression shear strength in applications aimed at this type of sliding.

Conceivably, this results from the fact that after the lubricating coating compound of the present invention is applied to the substrate surface, reaction with the substrate due to the triazinethiol first occurs in the process of predrying and curing, and the epoxy resin component then migrates to the reaction surface of the triazinethiol by taking precedence over the silicone component, thereby causing adhesion.

In addition, this also results from the fact that the oil content and the wax-like substance, which would otherwise cause a decline in the adhesion strength, are prevented from migrating to the adhesive interface or covering the interface.

Accordingly, a film of a preferable form is obtained in which the silicone component converted into the three-dimensional network structure and the nonreactive silicone oil, as well as the oil and the wax-like substance, are distributed in greater amounts on the obverse surface side of the film, i.e., on the sliding surface side.

Since the silicone component converted into the three-dimensional network structure has the function of a retainer for the nonreactive silicone oil, the bleadout of the nonreactive silicone oil to the sliding surface can be suppressed appropriately, so that it is possible to maintain a favorable sliding characteristic over an extended period of time.

The lubricating coating compound of the present invention is applied as a film to a member requiring sliding, such as a bearing or a support used for a bridge structure, a building, or the like, and forms a sliding surface exhibiting excellent low-friction and abrasion-resistance characteristics.

This lubricating coating compound may be applied to the sliding surface on either side of two mutually sliding members. Namely, the lubricating coating compound may be provided on the sliding surface of a bearing, or on the sliding surface of a bearing plate in the case of the support or the like. Alternatively, the lubricating coating compound may be provided on the mating member opposing this sliding member, i.e., on a shaft or a slider in the case of the bearing, and on a sliding surface of an upper structural base or a lower structural base in the case of the support.

Here, a synthetic resin which forms the sliding surface of a second sliding member which is held in sliding contact with a first sliding member, in which the aforementioned lubricating coating compound is applied, and a lubricating film is formed, is not particularly limited, and it is possible to use either a thermoplastic resin or a thermosetting resin. For example, it is possible to cite a phenolic resin, an epoxy resin, a polyolefin, a polyacetal, a polyamide, a polybutylene terephthalate, a polyphenylene sulfide, a polyether ketone, a fatty ketone, a fluorocarbon resin, a polyimide resin, an aromatic polyester resin, and the like. These synthetic resins may be used in a combination of two kinds or more.

In addition, it is possible to use a synthetic resin in which a lubricating composition and an reinforcing filler are mixed. As the lubricating composition, it is possible to cite lubricating oil, grease, wax, graphite, molybdenum disulfide, a fluorocarbon resin, and the like. As the reinforcing filler, it is possible to cite a glass powder, a glass fiber, a carbon powder, a carbon fiber, an aramid fiber, and the like.

As for these synthetic resins, various forms of use can be adopted. For example, a block-shaped or plate-shaped molded product may be used by being embedded in a recess, which is formed in a backing material formed of a metal or the like, in such a manner as to project partially. Alternatively, the molded product may be used by being bonded or screwed down to the surface of the backing material, or may be coated on the surface of the backing material as a thin film.

As this thin film type, it is possible to adopt a multilayered sliding member in which a porous sintered layer formed of a copper alloy is provided on a steel plate, and a synthetic resin is supplied to the sintered layer and is subjected to heating and sintering so as to allow a resin thin film to be coated thereon. Further, it is possible to adopt a two-layered structure in which the aforementioned synthetic resin is formed as a cured film directly on the surface of a backing material formed of steel or the like, e.g., one in which a solvent-dispersed type of a tetrafluoroethylene resin made by DAIKIN INDUSTRIES, LTD. (tradename: POLYFLON TFE ENAMEL) is applied to the surface of a backing material, and a cured film is formed by effecting baking. Each of the sliding members described above can be used effectively.

In the slide bearing apparatus of the present invention, the sliding surfaces of the first sliding member and the second sliding member which are held in sliding contact with each other may be respectively planar surfaces. Alternatively, the first sliding member may have a concave surface of a circular arc-shaped cross section having a predetermined radius of curvature, while the second sliding member may have a convex surface of a circular arc-shaped cross section having the same radius of curvature as the aforementioned concave surface of a circular arc-shaped cross section, such that the convex surface is held in sliding contact with the concave surface.

Hereafter, a description will be given of examples.

CONCERNING EXAMPLES 1 TO 11

By using as substrates a plate-shaped carbon steel S45C for machine structural use with a width of 40 mm, a length of 280 mm, and a thickness of 10 mm, lubricating coating compounds having components shown in Table 2 and compounding ratios shown in Tables 3 and 4 were sprayed to their surfaces subjected to shot blasting and degreasing treatment, predrying was effected at 80° C. for 30 minutes to allow the solvent to volatilize, and baking was performed at 180° C. for 30 minutes, thereby obtaining first sliding members (Examples 1 to 11) with a film thickness of 30 μm. Test specimens in Comparative Examples 1 to 3 shown in Table 4 were also fabricated under the similar conditions. The respective components are shown in parts by weight.

TABLE 2

| Component | Product Used |
| --- | --- |
| Epoxy resin | "Epikote-828 (tradename)" made by Yuka Shell Epoxy Kabushiki Kaisha; epoxy equivalent 190 |
| Reactive silicone oil having an epoxy group | "KF-102 (tradename)" made by ShinEtsu Chemical Co., Ltd.; epoxy equivalent 3,600 |
| Triazinethiol | 2-dibutylamino-4,6-dithiol-S-triazine "ZISNET DB (tradename)" made by SANKYO KASEI CO., LTD. |
| Amine | modified cycloaliphatic amine "Epikure-113 (tradename)" made by Yuka Shell Epoxy Kabushiki Kaisha |
| Tetrafluoroethylene resin (PTFE) | "Rublon L-5 (tradename)" made by DAIKIN INDUSTRIES, LTD. |
| Mineral oil | SAE #30 engine oil, commercially available |
| Graphite | flake graphite, 200 mesh or under, commercially available |
| Solvent | a mixture of methyl isobutyl ketone and toluene |

The solid content in the lubricating coating compound was 35 wt. %. The mineral oil was regarded as constituting the solid content.

TABLE 3

| Present Invention | Epoxy Resin (828) | Silicone oil (KF-102) | Triazinethiol (DB) | Amine | Filler |
| --- | --- | --- | --- | --- | --- |
| Example 1 | 100 | 2 | 72 | — | — |
| Example 2 | 100 | 5 | 73 | — | — |
| Example 3 | 100 | 5 | 0.5 | 32 | PTFE 5.0 |
| Example 4 | 100 | 5 | 19 | 24 | — |
| Example 5 | 100 | 5 | 19 | 24 | graphite 5.0 |
| Example 6 | 100 | 5 | 19 | 24 | mineral oil 2.5 |
| Example 7 | 100 | 5 | 19 | 24 | graphite 5.0 mineral oil 2.5 |

TABLE 4

| Present Invention | Epoxy Resin (828) | Silicone oil (KF-102) | Triazinethiol (DB) | Amine | Filler |
| --- | --- | --- | --- | --- | --- |
| Example 8 | 100 | 5 | 38 | 16 | — |
| Example 9 | 100 | 10 | 74 | — | — |
| Example 10 | 100 | 20 | 74 | — | — |
| Example 11 | 100 | 30 | 75 | — | — |
| Comparative Example 1 | 100 | 1 | 72 | — | — |
| Comparative Example 2 | 100 | — | 72 | — | PTFE 5.0 |
| Comparative Example 3 | 100 | — | 0.5 | 32 | PTFE 5.0 |

Rod-shaped molded products each having a diameter of 10 mm and a height of 14 mm were prepared as second sliding members (A). Each second sliding member (A) was composed of a resin composition in which 15 wt. % of "MF06JB1-20 (tradename)" made by Asahi Fiber Glass Co., Ltd. and having a diameter of 10 μm and an average length of 63 μm was contained as a glass fiber powder, 2 wt. % of "P84 (tradename)" made by Lenzing Corp. was contained as a polyimide resin powder, and the balance consisted of a tetrafluoroethylene resin "Teflon 7AJ (tradename)" made by DUPONT-MITSUI FLUOROCHEMICALS CO., LTD. End faces of these second sliding members (A) were set as sliding surfaces.

In addition, rod-shaped molded products each having a diameter of 10 mm and a height of 14 mm were prepared as second sliding members (B), each of which was composed of a resin composition containing 20 wt. % of the aforementioned polyimde resin powder and the balance consisting of the aforementioned tetrafluoroethylene resin. End faces of these second sliding members (B) were set as sliding surfaces.

As a test machine, a reciprocating test machine was used which combined a pressurizing section capable of applying a load in the vertical direction (maximum vertical load: 500 kgf) by an air cylinder and a movable horizontal supporting table capable of being pushed and pulled in the horizontal direction in a predetermined mode (maximum horizontal stroke: 300 mm, maximum horizontal velocity: 80 cm/sec.) by a servo motor, and which performed sliding by the pushing and pulling in the horizontal direction while applying a predetermined load in the vertical direction.

The second sliding member (A) or (B) with a diameter of 10 mm and a height of 14 mm was mounted on the pressurizing section of the test machine in a state in which the second sliding member was held in the diametrical direction over a length of 10 mm with a 4 mm portion thereof projecting downward. On the other hand, each of the test pieces (Examples 1 to 11) was mounted and fixed on the horizontal supporting table by fastening tools. The test conditions are listed below, and FIG. 1 shows a model of the waveform of the test velocity.

(Test Conditions)

| | |
| --- | --- |
| Velocity: | 1 cm/sec. to 50 cm/sec. |
| Load: | 20 kgf/cm$^2$ to 400 kgf/cm$^2$ |
| Test stroke: | 220 mm |
| Waveform of test velocity: | trapezoidal waveform |

Tables 5, 6, and 7 show the coefficients of kinetic friction with respect to combinations of the first sliding members (Examples 1 to 11) and the second sliding members (A) and (B) in cases where the sliding velocity was fixed at 1 cm/sec., and the load was varied in the range of 20 to 400 kgf/cm$^2$.

It can be seen that if the compounding amount of the reactive silicone oil with an epoxy group exceeds 2 parts by weight, the effect on the coefficient of friction is noticeable. However, in the combinations of Example 11 and the second sliding members (A) and (B) with this compounding amount set to 30 parts by weight, a decline in the mechanical strength of the film begins appear. Namely, a sign of a rise in the coefficient of kinetic friction can be noted in a heavy load region.

Accordingly, this test result reveals that the compounding amount of the reactive silicone oil with an epoxy group is preferably set to 2 to 30 parts by weight, particularly 5 to 20 parts by weight.

TABLE 5

| | | \multicolumn{6}{c}{Load} |
| --- | --- | --- | --- | --- | --- | --- | --- |
| | | 20 | 50 | 100 | 200 | 300 | 400 |
| Examples of the Invention (Combinations) | A-1 | 0.055 | 0.045 | 0.039 | 0.034 | 0.030 | 0.025 |
| | B-1 | 0.055 | 0.044 | 0.037 | 0.033 | 0.030 | 0.024 |
| | A-2 | 0.052 | 0.041 | 0.032 | 0.022 | 0.021 | 0.018 |
| | B-2 | 0.052 | 0.040 | 0.030 | 0.020 | 0.020 | 0.018 |
| | A-3 | 0.053 | 0.040 | 0.031 | 0.021 | 0.020 | 0.018 |
| | B-3 | 0.051 | 0.040 | 0.030 | 0.021 | 0.020 | 0.017 |
| | A-4 | 0.051 | 0.043 | 0.033 | 0.023 | 0.021 | 0.019 |
| | B-4 | 0.050 | 0.042 | 0.032 | 0.021 | 0.020 | 0.018 |
| | A-5 | 0.052 | 0.043 | 0.033 | 0.023 | 0.020 | 0.019 |
| | B-5 | 0.051 | 0.043 | 0.031 | 0.022 | 0.020 | 0.019 |
| | A-6 | 0.041 | 0.038 | 0.030 | 0.022 | 0.020 | 0.019 |

TABLE 6

| | | \multicolumn{6}{c}{Load} |
| --- | --- | --- | --- | --- | --- | --- | --- |
| | | 20 | 50 | 100 | 200 | 300 | 400 |
| Examples of the Invention (Combinations) | B-6 | 0.040 | 0.037 | 0.030 | 0.022 | 0.019 | 0.019 |
| | A-7 | 0.042 | 0.038 | 0.030 | 0.023 | 0.020 | 0.019 |
| | B-7 | 0.041 | 0.037 | 0.030 | 0.022 | 0.020 | 0.018 |
| | A-8 | 0.051 | 0.043 | 0.033 | 0.022 | 0.021 | 0.019 |
| | B-8 | 0.051 | 0.042 | 0.032 | 0.021 | 0.020 | 0.019 |
| | A-9 | 0.048 | 0.040 | 0.029 | 0.021 | 0.020 | 0.018 |
| | B-9 | 0.048 | 0.041 | 0.029 | 0.020 | 0.019 | 0.019 |
| | A-10 | 0.045 | 0.040 | 0.029 | 0.022 | 0.022 | 0.019 |
| | B-10 | 0.044 | 0.040 | 0.028 | 0.020 | 0.021 | 0.019 |
| | A-11 | 0.044 | 0.040 | 0.030 | 0.024 | 0.024 | 0.026 |
| | B-11 | 0.044 | 0.040 | 0.028 | 0.024 | 0.025 | 0.026 |

TABLE 7

| Comparative Examples | \multicolumn{6}{c}{Load} |
| --- | --- | --- | --- | --- | --- | --- |
| (Combinations) | 20 | 50 | 100 | 200 | 300 | 400 |
| A-1 | — | — | 0.066 | 0.063 | 0.058 | 0.054 |
| B-1 | — | — | 0.064 | 0.062 | 0.058 | 0.054 |
| A-2 | — | — | 0.115 | 0.094 | 0.085 | 0.082 |
| B-2 | — | — | 0.095 | 0.092 | 0.083 | 0.078 |
| A-3 | — | — | 0.110 | 0.090 | 0.083 | 0.080 |
| B-3 | — | — | 0.090 | 0.091 | 0.081 | 0.075 |

It should be noted that although 2.5 parts by weight of mineral oil is contained as a filler in Examples 6 and 7, it can be seen that the coefficient of friction is low in a light load region in comparison with the other examples in which the mineral oil is not contained.

Tables 8 and 9 show the coefficients of kinetic friction with respect to combinations of the second sliding members (A) and Examples 1 to 11 in cases where and the load was fixed at 200 kgf/cm², and the sliding velocity was varied in the range of 10 to 50 cm/sec. The coefficient of kinetic friction shows a gradual rise with an increase in the velocity.

Although this tendency can be noted in both the examples of the present invention and comparative examples, but the tendency in the examples of the present invention was small. In addition, there is a characteristic that the value of the coefficient of kinetic friction is very small.

TABLE 8

| Examples of the Invention | \multicolumn{5}{c}{Velocity} |
| --- | --- | --- | --- | --- | --- |
| (Combinations) | 10 | 20 | 30 | 40 | 50 |
| A-1 | 0.033 | 0.036 | 0.037 | 0.040 | 0.040 |
| A-2 | 0.031 | 0.033 | 0.036 | 0.039 | 0.040 |
| A-3 | 0.031 | 0.033 | 0.035 | 0.037 | 0.039 |
| A-4 | 0.031 | 0.033 | 0.035 | 0.037 | 0.039 |
| A-5 | 0.031 | 0.033 | 0.036 | 0.038 | 0.039 |
| A-6 | 0.030 | 0.030 | 0.032 | 0.035 | 0.037 |
| A-7 | 0.030 | 0.031 | 0.033 | 0.035 | 0.038 |
| A-8 | 0.031 | 0.032 | 0.035 | 0.038 | 0.039 |
| A-9 | 0.030 | 0.031 | 0.032 | 0.035 | 0.037 |
| A-10 | 0.031 | 0.031 | 0.033 | 0.036 | 0.039 |
| A-11 | 0.032 | 0.034 | 0.036 | 0.039 | 0.041 |

TABLE 9

| Comparative Examples | \multicolumn{5}{c}{Velocity} |
| --- | --- | --- | --- | --- | --- |
| (Combinations) | 10 | 20 | 30 | 40 | 50 |
| A-1 | 0.067 | 0.071 | 0.076 | 0.088 | 0.105 |
| A-2 | 0.100 | 0.130 | 0.135 | 0.150 | 0.160 |
| A-3 | 0.095 | 0.120 | 0.130 | 0.140 | 0.145 |

Figure 2:
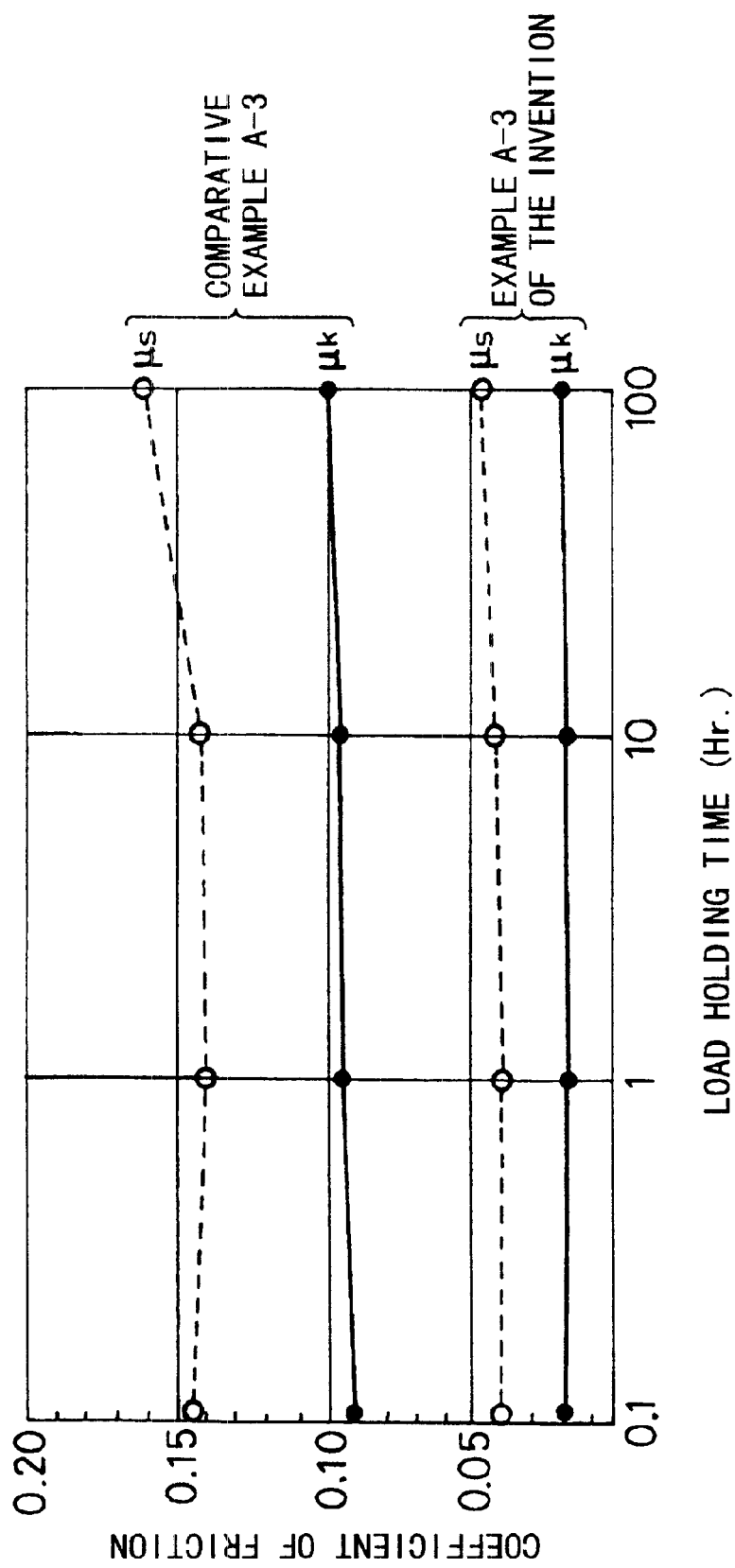
FIG. 2 is a graph illustrating the test results.

FIG. 2 shows the results of measurement of the effect of the load holding time on the coefficient of kinetic friction, $\mu k$, and the coefficient of static friction, As, with respect to the combination of Example 3 and the second sliding member (A) and the combination of the second sliding member (A) and Comparative Example 3 under the conditions of a 300 kgf/cm load and a 1 cm/sec. sliding velocity. The abscissa in FIG. 2 is expressed on a logarithmic scale.

As is apparent from FIG. 2 as well, in the combination of the example of the present invention, the values of both the coefficient of static friction, $\mu s$, and the coefficient of kinetic friction, $\mu k$, were small, both values were close to each other, and the effect of the load holding time on the coefficient of static friction, $\mu s$, and the coefficient of kinetic friction, $\mu k$, was very small.

Meanwhile, in the combination of the comparative example, the value of the coefficient of static friction, $\mu s$, was large at 0.1 or more, and the difference between the coefficient of static friction, $\mu s$, and the coefficient of kinetic friction, $\mu k$, was large. In addition, the effect of the holding time exerted on the coefficient of static friction, As, and the coefficient of kinetic friction, $\mu k$, was also noted.

The fact that the difference between the coefficient of static friction, $\mu s$, and the coefficient of kinetic friction, $\mu k$, is large means that stick-slip is liable to occur during sliding, and can constitute a cause of the occurrence of noise. The combinations in the examples of the present invention showed utterly no occurrence of such phenomena.

It should be noted that the wear of the film in the combinations in the examples of the present invention, as compared with that of the comparative examples, was very small in the range of one over several tens to one over several hundreds.

CONCERNING EXAMPLES 12 TO 22

The sliding characteristics of films in Examples 12 to 22 formed by the lubricating coating compounds of the present invention were measured by the following method.

Reciprocating sliding test: The coefficient of friction and the amount of wear were measured under the conditions listed in Table 10.

TABLE 10

| Sliding velocity: | 20 cm/sec |
|---|---|
| Load: | 200 kgf/cm² |
| Stroke: | 220 mm |
| No. of cycles: | 1,000 cycles |
| Seconding sliding member: | The aforementioned second sliding member (A). An end face of this second sliding member (A) was set as the sliding surface. |

CONCERNING EXAMPLE 12

To obtain the lubricating coating compound, the following components were dissolved in methyl ethyl ketone, i.e., an organic solvent, such that the overall content of these components becomes 33 wt. %.: as the epoxy resin, 76 parts by weight of "Epikote-828 (tradename)" made by Yuka Shell Epoxy Kabushiki Kaisha and having an epoxy equivalent of 190; as the curing agent, 24 parts by weight of a modified cycloaliphatic amine "Epikure-113 (tradename)" made by Yuka Shell Epoxy Kabushiki Kaisha; as the reactive silicone oil with an epoxy group, 4.8 parts by weight of "KF-102 (tradename)" made by Shin-Etsu Chemical Co., Ltd., having an epoxy equivalent of 3,600 and corresponding to Formula (9) having an cycloaliphatic epoxy group in a side chain; as the triazinethiol, 0.2 part by weight of 2-dibutylamino-4,6-dithiol-S-triazine "ZISNET DB (tradename)" made by SANKYO KASEI CO., LTD.; and as the nonreactive silicone oil, 5 parts by weight of "KF 96 (tradename)" made by Shin-Etsu Chemical Co., Ltd having a viscosity of 5,000 cSt.

By using as a substrate a plate-shaped stainless steel plate SUS 304 having a width of 40 mm, a length of 280 mm, and a thickness of 10 mm, the aforementioned lubricating coating compound was sprayed onto the surface subjected to shot blasting and degreasing treatment, predrying was performed at 80° C. for about 30 minutes to allow the solvent to volatilize, and curing was performed at 180° C. for 30 minutes, thereby obtaining a first sliding member having a film thickness of 30 cm. The results of an evaluation test are shown in Table 11.

CONCERNING EXAMPLES 13 TO 22 AND COMPARATIVE EXAMPLE 4

In Examples 13 to 22, first sliding members were obtained in the same way as in Example 12 other than the fact that the compositions were modified as shown in Tables 11 to 13. In Example 20, however, hexahydrophthalic anhydride which is an acid anhydride was used as the curing agent, and benzyldimethylamine which is a tertiary amine was used as the curing accelerator. In this case, after predrying was effected at 80° C. for 30 minutes, curing was performed at 200° C. for 30 minutes. The results of evaluation of the first sliding members in the respective examples are shown in Tables 11 to 13.

In Tables 11 to 13, KF-101 is a reactive silicone oil made by Shin-Etsu Chemical Co., Ltd., corresponding to Formula (8) having an epoxy group in a side chain, and having an epoxy equivalent of 350; SH 510 is a methylphenyl silicone oil made by Toray-Dow Corning Silicone Corp. and having a viscosity of 500 cSt: and PTFE is a tetrafluoroethylene resin.

TABLE 11

| | Example 12 | Example 13 | Example 14 | Example 15 | Example 16 |
|---|---|---|---|---|---|
| Compositions: | | | | | |
| Epoxy resin | 76 | 76 | 76 | 76 | 76 |
| Curing agent | 24 | 24 | 24 | 24 | 24 |
| Reactive silicone oil: | | | | | |
| KF-102 | 4.8 | 4.8 | 4.8 | | 4.8 |
| KF-101 | | | | 3.6 | |
| Triazinethiol | 0.2 | 0.2 | 0.2 | 1.4 | 0.2 |
| Nonreactive silicone oil: | | | | | |
| KF 96 | 5 | 2 | 10 | 5 | |
| SH 510 | | | | | 5 |
| Sliding characteristics: | | | | | |
| Friction coefficient | 0.030 | 0.040 | 0.030 | 0.035 | 0.030 |
| Amount of wear: | | | | | |
| 1st sliding member (μm) | 10 | 15 | 20 | 15 | 10 |
| 2nd sliding member (mg) | 13 | 17 | 14 | 18 | 15 |

TABLE 12

| | Example 17 | Example 18 | Example 19 | Example 20 |
|---|---|---|---|---|
| Compositions: | | | | |
| Epoxy resin | 76 | 76 | 76 | 55 |
| Curing agent | 24 | 24 | 24 | 45 acid anhydride (containing 0.5 part by weight of tertiary amine) |
| Reactive silicone oil: | | | | |
| KF-102 | 1.9 | 9.6 | 19.3 | 4.8 |
| Triazinethiol | 0.1 | 0.4 | 0.7 | 0.2 |
| Nonreactive silicone oil: | | | | |
| KF 96 | 5 | 5 | 5 | 5 |
| Sliding characteristics: | | | | |
| Friction coefficient | 0.040 | 0.030 | 0.030 | 0.030 |
| Amount of wear | | | | |
| 1st sliding member (μm) | 20 | 20 | 20 | 10 |
| 2nd sliding member (mg) | 20 | 13 | 10 | 15 |

TABLE 13

|  | Example 21 | Example 22 | Comparative Example 4 |
|---|---|---|---|
| Compositions: |  |  |  |
| Epoxy resin | 76 | 76 | 76 |
| Curing agent | 24 | 24 | 24 |
| Reactive silicone oil: |  |  |  |
| KF-102 | 4.8 | 4.8 |  |
| Triazinethiol | 0.2 | 0.2 |  |
| Nonreactive silicone oil: |  |  |  |
| KF 96 | 5 | 5 |  |
| Fillers: |  |  |  |
| PTFE | 5 |  | 5 |
| Graphite |  | 5 |  |
| Sliding characteristics: |  |  |  |
| Friction coefficient | 0.030 | 0.040 | 0.120 |
| Amount of wear |  |  |  |
| 1st sliding member (μm) | 10 | 15 | Substrate exposed |
| 2nd sliding member (mg) | 20 | 34 | 150 |

From the above results, it can be understood that the films obtained from the lubricating coating compounds of the present invention exhibit lower coefficients of friction and smaller amounts of wear than Comparative Example 4.

CONCERNING EXAMPLES 23 TO 34 AND COMPARATIVE EXAMPLE 5

By using as substrates plate-shaped stainless steel plates SUS 304 with a width of 40 mm, a length of 280 mm, and a thickness of 10 mm, lubricating coating compounds of compositions having components shown in Tables 14 to 16 and dissolved in a mixed solvent-diluent solution of methyl isobutyl ketone and toluene (solid content: 33 wt. %) were sprayed to the substrate surfaces subjected to shot blasting and degreasing treatment, predrying was effected at 80° C. for 30 minutes to allow the solvent to volatilize, and curing was performed at 180° C. for 30 minutes, thereby obtaining Examples 23 to 34 of first sliding members and Comparative Example 5 with a film thickness of 40 μm.

In the tables, the epoxy resin shows "Epikote-828 (tradename), epoxy equivalent: 190" made by Yuka Shell Epoxy Kabushiki Kaisha; the polyamine shows the modified cycloaliphatic amine "Epikure-113 (tradename)" made by Yuka Shell Epoxy Kabushiki Kaisha; the acid anhydride shows hexahydrophthalic anhydride; the tertiary amine shows benzyldimethylamine; KF-102 shows a reactive silicone oil with an epoxy group "KF-102 (tradename)", epoxy equivalent: 3,600, and viscosity: 4,000 cSt"made by Shin-Etsu Chemical Co., Ltd. and having a cycloaliphatic epoxy group in a side chain; KF-101 shows a reactive silicone oil with an epoxy group "KF-101 (tradename)", epoxy equivalent: 350, and viscosity: 2,000 cSt" made by Shin-Etsu Chemical Co., Ltd. and having a glycidyl group in a side chain; KF-96 shows a dimethyl silicone oil "KF-96 (tradename), viscosity: 5,000 cSt" made by Shin-Etsu Chemical Co., Ltd.; SH 510 shows a methylphenyl silicone oil "SH 510 (tradename), viscosity: 500 cSt" made by Toray-Dow Corning Silicone Corp.; the triazinethiol shows 2-dibutylamino-4,6-dithiol-S-triazine "ZISNET DB (tradename)" made by SANKYO KASEI CO., LTD.; and PTFE shows a tetrafluoroethylene resin.

TABLE 14

|  | Examples of the Invention | | | | |
|---|---|---|---|---|---|
|  | 23 | 24 | 25 | 26 | 27 |
| Epoxy resin | 76 | 76 | 76 | 76 | 55 |
| Curing agents: |  |  |  |  |  |
| Polyamine | 24 | 24 | 24 | 24 |  |
| Acid anhydride |  |  |  |  | 45 (containing 0.5 part by weight of tertiary amine) |
| Reactive silicone oil KF-102 | 1.9 | 4.8 | 9.6 | 19.3 | 9.6 |
| Triazinethiol | 0.1 | 0.2 | 0.4 | 0.7 | 0.4 |

TABLE 15

|  | Examples of the Invention | | | | |
|---|---|---|---|---|---|
|  | 28 | 29 | 30 | 31 | 32 |
| Epoxy resin | 76 | 76 | 76 | 76 | 76 |
| Curing agent: |  |  |  |  |  |
| Polyamine | 24 | 24 | 24 | 24 | 24 |
| Reactive silicone oil: |  |  |  |  |  |
| KF-102 | 4.8 | 4.8 | 4.8 |  | 4.8 |
| KF-101 |  |  |  | 3.6 |  |
| Triazinethiol | 0.2 | 0.2 | 0.2 | 1.4 | 0.2 |
| Nonreactive silicone oil: |  |  |  |  |  |
| KF 96 | 2 | 5 | 10 | 5 |  |
| SH 510 |  |  |  |  | 5 |

TABLE 16

|  | Examples of the Invention | | Comparative Example |
|---|---|---|---|
|  | 33 | 34 | 5 |
| Epoxy resin | 76 | 76 | 76 |
| Curing agent: |  |  |  |
| Polyamine | 24 | 24 | 24 |
| Reactive silicone oil |  |  |  |
| KF-102 | 9.6 | 4.8 |  |
| Triazinethiol | 0.4 | 0.2 |  |
| Nonreactive silicone oil |  |  |  |
| KF 96 |  | 5 |  |
| Fillers: |  |  |  |
| PTFE | 5 |  | 5 |
| Graphite |  | 5 |  |

In addition to the second sliding members (A) and (B), second sliding members (C), (D), and (E) were prepared as follows. As the second sliding members (C), rod-shaped molded products each having a diameter of 10 mm and a height of 14 mm were prepared, each of which was composed of a resin composition containing 15 wt. % of a tetrafluoroethylene resin "Teflon 7AJ (tradename)" made by DUPONT-MITSUI FLUOROCHEMICALS CO., LTD, 25 wt. % of a tetrafluoroethylene resin "Rublon L-5 (tradename)" made by DAIKIN INDUSTRIES, LTD., and the balance consisting of a polyphenylene sulfide "TOHPREN PPST-4 (tradename)" made by TOHPREN CO. LTD. End faces of these second sliding members (C) were set as sliding surfaces. As the second sliding members (D), rod-shaped molded products each having a diameter of 10 mm and a height of 14 mm were prepared, each of which was composed of a resin composition containing 5 wt. % of a mineral oil and the balance consisting of a polyacetal "Duracon M90 (tradename)" made by POLYPLASTICS CO., LTD., and end faces of these second sliding members (D) were set as sliding surfaces. As the second sliding members (E), rod-shaped molded products each having a diameter of 10 mm and a height of 14 mm were prepared, each of which was composed of a resin composition containing 20 wt. % of carbon fibers "Kreca Chop M-107T (tradename)" made by Kureha Chemical Industry Co., Ltd. and having a diameter of 18 μm and a length of 0.7 mm, 25 wt. % of fine strips of cotton cloth having a size of 4×6 mm, 5 wt. % of graphite, and the balance consisting of a phenolic resin. End faces of these second sliding members (E) were set as sliding surfaces.

With respect to combinations of, on the one hand, Examples 23 to 34 and Comparative Example 5 of the first sliding members and, on the other hand, the above-described second sliding members (A) to (E), their sliding characteristics were evaluated by the following method.

Reciprocating Sliding Test 1

The Coefficient of Friction and the Amount of Wear were Measured under the Conditions Listed in Table 17.

TABLE 17

| | |
|---|---|
| Sliding velocity: | 20 cm/sec |
| Load: | 200 kgf/cm² |
| Stroke: | 220 mm |
| No. of cycles: | 500 cycles |

Tables 18 to 24 show the combinations of, on the one hand, Examples 23 to 34 and Comparative Example 5 of the first sliding members and, on the other hand, the second sliding members (A) to (E) as well as the results of evaluation. Here, the coefficient of friction shows the coefficient of kinetic friction during a stable period after a test start, while the amount of wear shows an amount of change in the size of each example of the first sliding member and an amount of change in the weight of each example of the second sliding member after 500 cycles.

TABLE 18

| | Examples of the Invention (Combinations) | | | | |
|---|---|---|---|---|---|
| | A-23 | A-24 | A-25 | A-26 | A-27 |
| Coefficient of friction | 0.050 | 0.040 | 0.040 | 0.035 | 0.040 |
| Amount of wear: | | | | | |
| 1st sliding member, μm | 10 | 10 | 20 | 25 | 20 |
| 2nd sliding member, mg | 40 | 25 | 18 | 13 | 15 |

TABLE 19

| | Examples of the Invention (Combinations) | | | | |
|---|---|---|---|---|---|
| | A-28 | A-29 | A-30 | A-31 | A-32 |
| Coefficient of friction | 0.040 | 0.030 | 0.030 | 0.035 | 0.030 |
| Amount of wear: | | | | | |
| 1st sliding member, μm | 15 | 10 | 20 | 15 | 10 |
| 2nd sliding member, mg | 17 | 13 | 14 | 18 | 15 |

TABLE 20

| | Examples of the Invention (Combinations) | | | | |
|---|---|---|---|---|---|
| | A-33 | A-34 | B-25 | B-29 | B-33 |
| Coefficient of friction | 0.035 | 0.040 | 0.035 | 0.030 | 0.035 |
| Amount of wear: | | | | | |
| 1st sliding member, μm | 20 | 15 | 15 | 10 | 18 |
| 2nd sliding member, mg | 20 | 24 | 15 | 10 | 12 |

TABLE 21

| | Examples of the Invention (Combinations) | | | | |
|---|---|---|---|---|---|
| | C-25 | C-29 | C-33 | D-25 | D-29 |
| Coefficient of friction | 0.030 | 0.030 | 0.030 | 0.040 | 0.040 |
| Amount of wear: | | | | | |
| 1st sliding member, μm | 12 | 10 | 13 | 15 | 12 |
| 2nd sliding member, mg | 10 | 8 | 5 | 15 | 10 |

TABLE 22

| | Examples of the Invention (Combinations) | | | |
|---|---|---|---|---|
| | D-33 | E-25 | E-29 | E-33 |
| Coefficient of friction | 0.040 | 0.050 | 0.050 | 0.050 |
| Amount of wear: | | | | |
| 1st sliding member, μm | 20 | 25 | 20 | 25 |
| 2nd sliding member, mg | 13 | 10 | 7 | 8 |

TABLE 23

| | Comparative Examples (Combinations) | | |
|---|---|---|---|
| | A-5 | B-5 | C-5 |
| Coefficient of friction | 0.120 | 0.100 | 0.090 |
| Amount of wear: | | | |
| 1st sliding member, μm | substrate exposed | substrate exposed | 35 |
| 2nd sliding member, mg | 150 | 70 | 30 |

TABLE 24

|  | Comparative Examples (Combinations) | |
| --- | --- | --- |
|  | D-5 | E-5 |
| Coefficient of friction | 0.110 | 0.150 |
| Amount of wear: |  |  |
| 1st sliding member, μm | substrate exposed | substrate exposed |
| 2nd sliding member, mg | 40 | 50 |

As is apparent from the above results, in the case of the combinations of the examples of the present invention, low coefficients of friction were exhibited in the respective cases, and the amounts of wear also showed low values for both the first sliding members and the second sliding members. Thus, outstanding results were obtained. In contrast, in the case of the combinations of the comparative examples, the coefficient of friction was high in the respective cases, and the amounts of wear of the second sliding members were large. Further, except for the combination of C-5, the films of the first sliding members were completely worn and their substrates were exposed.

Reciprocating Sliding Test 2

The Coefficient of Friction was Measured under the Conditions Listed in Table 25.

TABLE 25

| Sliding velocity: | 20 cm/sec |
| --- | --- |
| Load: | 200 kgf/cm² |
| Stroke: | 220 mm |
| No. of cycles: | An intermittent test of a 100-cycle operation and a 5-minute pause was performed 5 times. |

Tables 26 and 27 show the combinations of, on the one hand, Examples 23 to 34 and Comparative Example 5 of the first sliding members and, on the other hand, the second sliding member (A) as well as the results of evaluation. Here, the coefficient of friction shows the coefficient of static friction.

TABLE 26

| Coefficient | Examples of the Invention (Combinations) | | | | | | |
| --- | --- | --- | --- | --- | --- | --- | --- |
| of friction: | A-23 | A-24 | A-25 | A-26 | A-27 | A-28 | A-29 |
| 1st time | 0.030 | 0.030 | 0.030 | 0.030 | 0.030 | 0.030 | 0.030 |
| 2nd time | 0.040 | 0.035 | 0.030 | 0.030 | 0.030 | 0.030 | 0.030 |
| 3rd time | 0.040 | 0.040 | 0.035 | 0.030 | 0.035 | 0.035 | 0.030 |
| 4th time | 0.045 | 0.040 | 0.035 | 0.030 | 0.035 | 0.035 | 0.030 |
| 5th time | 0.050 | 0.040 | 0.040 | 0.035 | 0.040 | 0.040 | 0.030 |

TABLE 27

| Coefficient of friction: | Examples of the Invention (Combinations) | | | | | Comparative Example (Combination) |
| --- | --- | --- | --- | --- | --- | --- |
|  | A-30 | A-31 | A-32 | A-33 | A-34 | A-5 |
| 1st time | 0.030 | 0.030 | 0.030 | 0.035 | 0.040 | 0.100 |
| 2nd time | 0.030 | 0.035 | 0.030 | 0.035 | 0.040 | 0.110 |
| 3rd time | 0.030 | 0.035 | 0.030 | 0.035 | 0.040 | 0.115 |
| 4th time | 0.030 | 0.035 | 0.030 | 0.035 | 0.040 | 0.120 |
| 5th time | 0.030 | 0.035 | 0.030 | 0.035 | 0.040 | 0.120 |

From the above results, it can be seen that in the combinations of the examples of the present invention the coefficient of static friction was low and stable. In contrast, in the case of the combinations of the comparative examples, although the coefficient of static friction was stable, its values were high.

Figure 3:
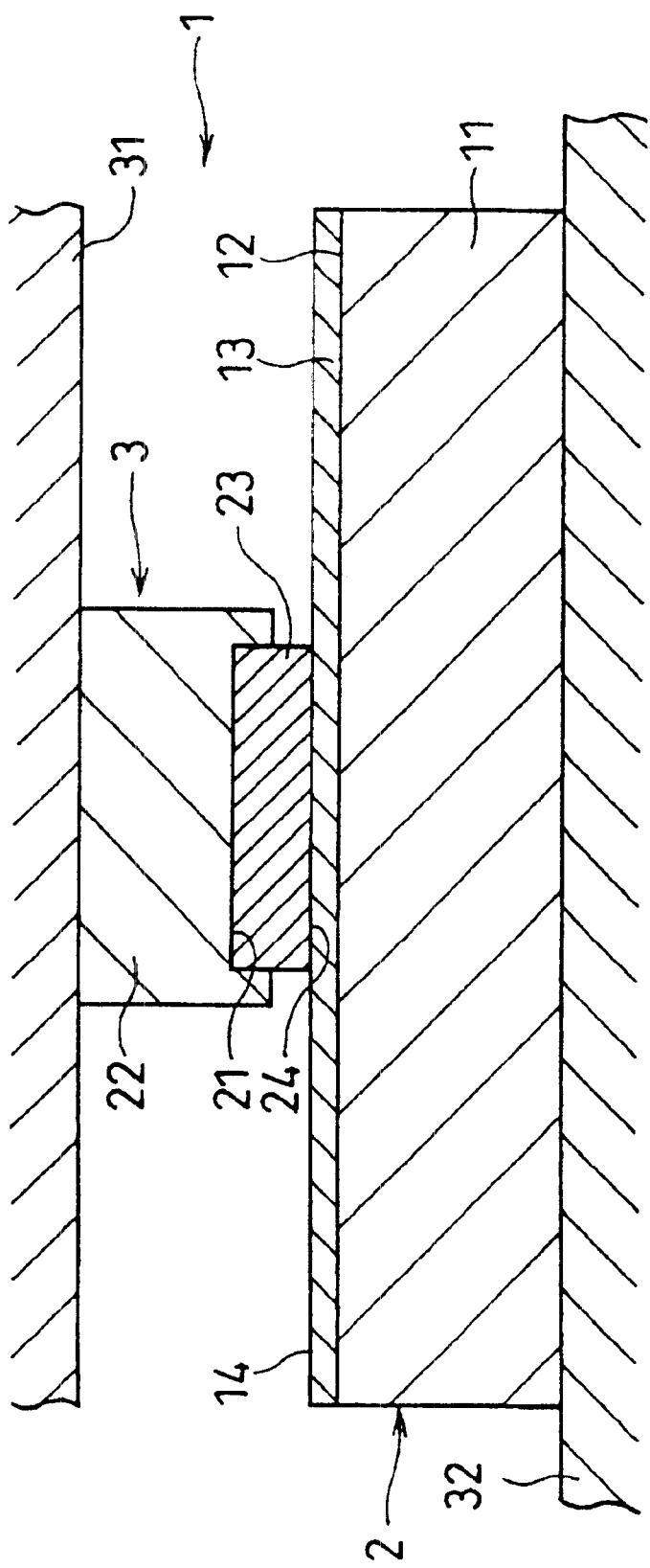
FIG. 3 is a cross-sectional view of a preferred embodiment of a slide bearing apparatus to which a sliding structure of the present invention is applied.
Figure 4:
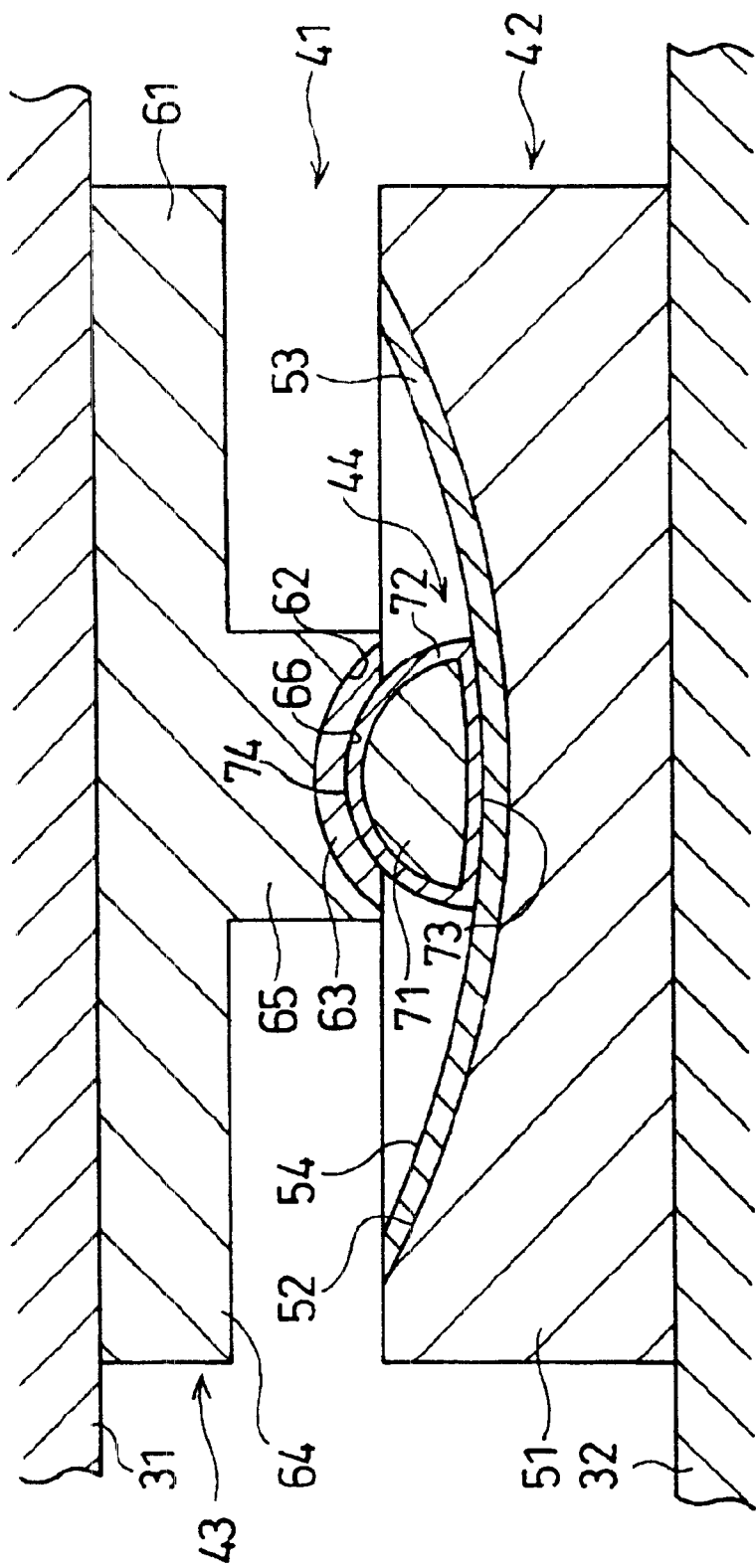
FIG. 4 is a cross-sectional view of another preferred embodiment of the slide bearing apparatus to which the sliding structure of the present invention is applied.
Figure 5:
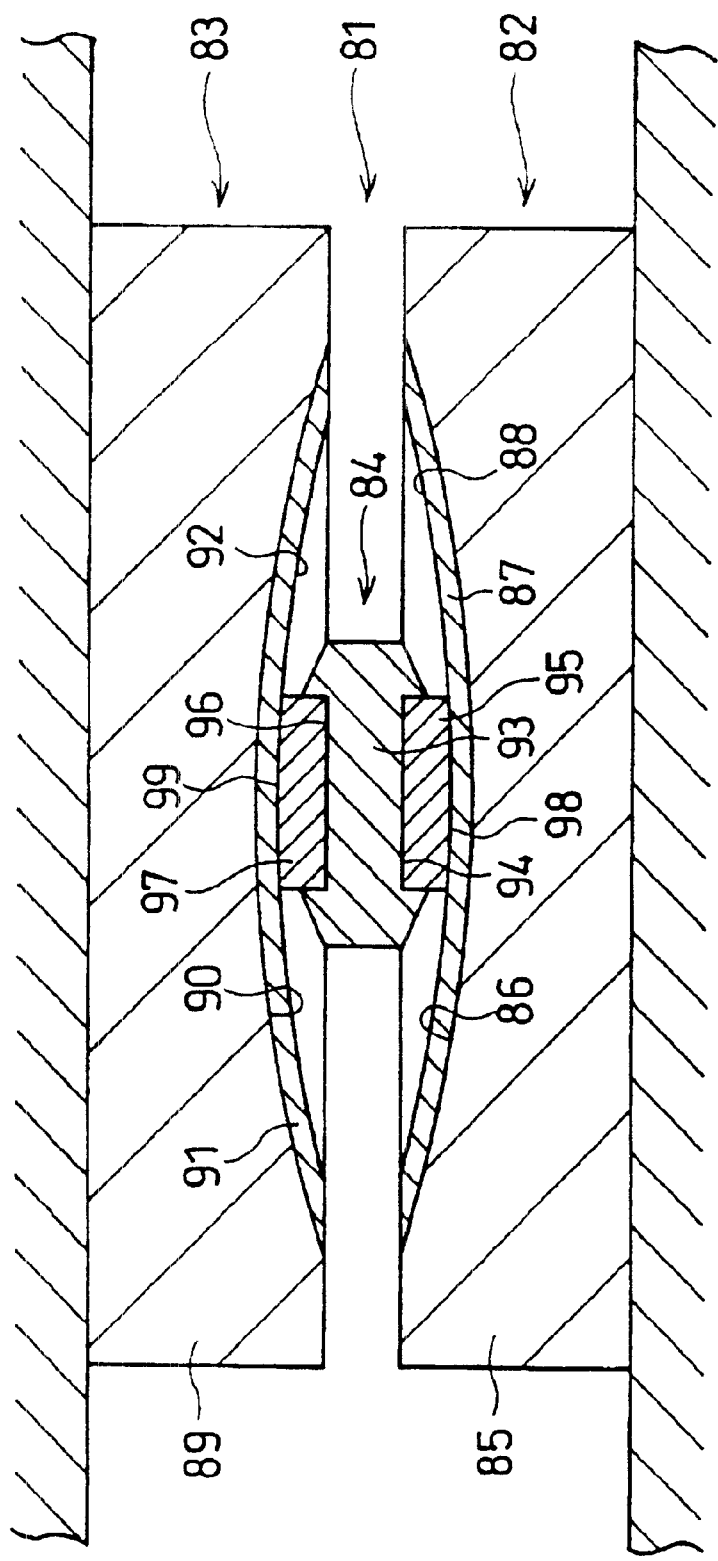
FIG. 5 is a cross-sectional view of still another preferred embodiment of the slide bearing apparatus to which the sliding structure of the present invention is applied.

Next, a description will be given of a slide bearing apparatus to which a sliding structure combining the above-described two sliding members is applied. FIG. 3 shows a slide bearing apparatus 1 whose sliding surface is planar, while FIGS. 4 and 5 show slide bearing apparatuses 41 and 81 whose sliding surfaces are spherical.

In FIG. 3, the slide bearing apparatus 1 is comprised of a planar member 2 which serves as the first sliding member as well as an opposing member 3 which abuts against the planar member 2 in such a manner as to be slidable in a horizontal direction and serves as the second sliding member.

The planar member 2 has a planar member body 11 formed of a material such as steel and a lubricating film 13 formed of a thermosetting synthetic resin formed integrally with one surface 12 of the planar member body 11. The lubricating film 13 is constituted by a composition which is composed of an epoxy resin, a curing agent, a reactive silicone oil with an epoxy group, and a triazinethiol. An exposed surface (upper surface) 14 of the lubricating film 13 which serves as a sliding surface is formed flatly.

The opposing member 3 is formed of a material such as steel, and has an opposing member body 22 having a recessed portion 21 at its lower surface as well as a slider 23 which is formed of a synthetic resin and is partially embedded in and attached to the recessed portion 21 of the opposing member 3. An exposed surface (lower surface) 24 of the slider 23 which serves as a sliding surface is formed flatly.

The slide bearing apparatus 1 is used in such a way that the opposing member 3 is disposed on an upper structure 31 side and is fixed to the upper structure 31 by means of bolts or the like, while the planar member 2 is disposed on the ground side and is fixed to a foundation 32 on the ground side by means of anchor bolts or the like. In addition, the slide bearing apparatus 1 is used by juxtaposing thereto original-position returning means such as laminated rubber bearing and/or horizontal springs. When horizontal vibrations occur in the foundation 32 on the ground side by means of an earthquake or the like, sliding displacement occurs between the exposed surfaces 14 and 24 of the planar member 2 and the opposing member 3, whereby the transmission of the horizontal vibrations of the foundation 32 on the ground side to the upper structure 31 is hampered, thereby protecting the upper structure 31 from the vibrations of the earthquake.

Moreover, since the sliding surface of the planar member 2 is formed by the lubricating film 13 made of a thermosetting synthetic resin constituted by a composition which is composed of an epoxy resin, a curing agent, a reactive silicone oil with an epoxy group, and a triazinethiol, and the slider 23 of the opposing member 3 which slidably abuts against it is formed of a synthetic resin, the sliding displacement between the planar member 2 and the opposing member 3 takes place with very little resistance. Therefore, the transmission of horizontal vibrations of the foundation 32 to the upper structure 31 can be hampered not only in medium-scale earthquake vibrations but also in small-scale earthquake vibrations in which the acceleration is relatively small, thereby making it possible to effectively protect the upper structure 31 from the earthquake vibrations.

The slide bearing apparatus 41 in FIG. 4 is comprised of a pair of concavely spherical members 42 and 43 disposed by opposing each other and serving as first sliding members, as well as an interposed member 44 interposed between the concavely spherical members 42 and 43, slidably abutting against the concavely spherical members 42 and 43, respectively, and serving as a second sliding member.

The concavely spherical member 42 has a concavely spherical member body 51 formed of a material such as steel and a lubricating film 53 formed of a thermosetting synthetic resin formed integrally with a concavely spherical surface 52 of the concavely spherical member 51. The lubricating film 53 is constituted by a composition which is composed of an epoxy resin, a curing agent, a reactive silicone oil with an epoxy group, and a triazinethiol. An exposed surface (upper surface) 54 of the lubricating film 53 which serves as a sliding surface is formed as a portion of a spherical surface having a radius of curvature R1.

The concavely spherical member 43 has a concavely spherical member body 61 formed of a material such as steel and a lubricating film 63 formed of a thermosetting synthetic resin formed integrally with a concavely spherical surface 62 of the concavely spherical member body 61. The concavely spherical member body 61 has a base portion 64 and a perpendicularly suspended portion 65 having a cylindrical or prismatic shape and formed integrally on the underside of the base portion 64, and the concavely spherical surface 62 is formed on a lower surface of the perpendicularly suspended portion 65. The lubricating film 63 is constituted by a composition which is composed of an epoxy resin, a curing agent, a reactive silicone oil with an epoxy group, and a triazinethiol. An exposed surface (lower surface) 66 of the lubricating film 63 which serves as a sliding surface is formed as a portion of a spherical surface having a radius of curvature R2(<R1).

The interposed member 44 has an interposed member body 71 formed semispherically of a material such as steel as well as sliding layers 72 formed of a synthetic resin and fitted over the interposed member body 71 in such a manner as to cover the entire surfaces of the interposed member body 71. A lower exposed surface (lower surface) 73 of the sliding layers 72 is formed as a portion of a spherical surface having the radius of curvature R1 and slidably abuts against the exposed surface 54, while an upper exposed surface (upper surface) 74 of the sliding layers 72 is formed as a portion of a spherical surface having the radius of curvature R2 and slidably abuts against the exposed surface 66.

The slide bearing apparatus 41 is used in such a way that the concavely spherical member 43 is disposed on the upper structure 31 side and is fixed to the upper structure 31 by means of bolts or the like, while the concavely spherical member 42 is disposed on the ground side and is fixed to the foundation 32 on the ground side by means of anchor bolts or the like. The slide bearing apparatus 41 may be used by juxtaposing thereto original-position returning means such as laminated rubber bearing and/or horizontal springs as in the case of the slide bearing apparatus 1, but may be used by making use of the original-position returning function of its own without using the original-position returning means. When horizontal vibrations occur in the foundation 32 on the ground side by means of an earthquake or the like, sliding displacement occurs between each of the concavely spherical members 42 and 43 and the interposed member 44, whereby the transmission of the horizontal vibrations of the foundation 32 on the ground side to the upper structure 31 is hampered, thereby protecting the upper structure 31 from the vibrations of the earthquake.

Moreover, since the sliding surfaces of each of the concavely spherical members 42 and 43 are formed by the lubricating films 53 and 63 made of the thermosetting synthetic resin constituted by the composition composed of the epoxy resin, the curing agent, the reactive silicone oil with an epoxy group, and the triazinethiol, and the sliding layers 72 of the interposed member 44 which slidably abut against them are formed of a synthetic resin, the sliding displacement between each of the concavely spherical members 42 and 43 and the interposed member 44 takes place with very little resistance. Therefore, an effect similar to that of the slide bearing apparatus 1 can be demonstrated.

The slide bearing apparatus 81 in FIG. 5 is comprised of a pair of concavely spherical members 82 and 83 disposed by opposing each other and serving as first sliding members, as well as an interposed member 84 interposed between the concavely spherical members 82 and 83, slidably abutting against the concavely spherical members 82 and 83, respectively, and serving as a second sliding member.

The concavely spherical member 82 has a concavely spherical member body 85 formed of a material such as steel and a lubricating film 87 formed of a thermosetting synthetic resin formed integrally with a concavely spherical surface 86 of the concavely spherical member body 85. The lubricating film 87 is constituted by a composition which is composed of an epoxy resin, a curing agent, a reactive silicone oil with an epoxy group, and a triazinethiol. An exposed surface (upper surface) 88 of the lubricating film 87 which serves as a sliding surface is formed as a portion of a spherical surface having the radius of curvature R1.

The concavely spherical member 83 is formed in the same way as the concavely spherical member 82, and has a concavely spherical member body 89 formed of a material such as steel and a lubricating film 91 formed of a thermosetting synthetic resin formed integrally with a concavely spherical surface 90 of the concavely spherical member body 89. The lubricating film 91 is constituted by a composition which is composed of an epoxy resin, a curing agent, a reactive silicone oil with an epoxy group, and a triazinethiol. An exposed surface (lower surface) 92 of the lubricating film 91 which serves as a sliding surface is formed as a portion of a spherical surface having the radius of curvature R1.

The interposed member 84 has a flat interposed member body 93 formed of a material such as steel, a slider 95 which is formed of a synthetic resin and is partially embedded in and attached to a recessed portion 94 at a lower surface of the interposed member body 93, and a slider 97 which is formed of a synthetic resin and is partially embedded in and attached to a recessed portion 96 at an upper surface of the interposed member body 93. A lower exposed surface (lower surface) 98 and an upper exposed surface (upper surface) 99 of the respective sliders 95 and 97, which serve as sliding surfaces, are each formed as a portion of a spherical surface having the radius of curvature R1, and slidably abut against the exposed surfaces 88 and 92 opposed thereto.

In the same way as the slide bearing apparatus 41, the slide bearing apparatus 81 is used in such a way that the concavely spherical member 83 is disposed on the upper structure 31 side and is fixed to the upper structure 31 by means of bolts or the like, while the concavely spherical member 82 is disposed on the ground side and is fixed to the foundation 32 on the ground side by means of anchor bolts or the like. The slide bearing apparatus 81 may also be used by juxtaposing thereto original-position returning means such as laminated rubber bearing and/or horizontal springs as in the case of the slide bearing apparatus 1, but may be used by making use of the original-position returning function of its own without using the original-position returning means. When horizontal vibrations occur in the foundation 32 on the ground side by means of an earthquake or the like, sliding displacement occurs between each of the concavely spherical members 82 and 83 and the interposed member 84, whereby the transmission of the horizontal vibrations of the foundation 32 on the ground side to the upper structure 31 is hampered, thereby protecting the upper structure 31 from the vibrations of the earthquake. Since, in the same way as the slide bearing apparatus 41, the sliding surfaces of each of the concavely spherical members 82 and 83 are formed by the lubricating films 87 and 91 made of the thermosetting synthetic resin constituted by the composition composed of the epoxy resin, the curing agent, the reactive silicone oil with an epoxy group, and the triazinethiol, and the sliders 95 and 97 of the interposed member 84 which slidably abut against them are formed of a synthetic resin, the sliding displacement between each of the concavely spherical members 82 and 83 and the interposed member 84 takes place with very little resistance. Therefore, an effect similar to those of the slide bearing apparatuses 1 and 41 can be demonstrated.

It should be noted that the entire interposed members 44 and 84 may be formed by sliders made of a synthetic resin. In addition, although the sliding surfaces of the slide bearing apparatuses 41 and 81 are formed as portions of spherical surfaces, they may be alternatively formed as portions of cylindrical surfaces. In other words, it suffices if the sliding surfaces are respectively formed as a concave and a convex surface whose cross sections are circularly arcuate. Furthermore, instead of the foregoing embodiments, an arrangement may be provided such that the planar member 2, the concave spherical members 42 and 43, and the concave spherical members 82 and 83 may be provided with sliders formed of a synthetic resin, while the opposing member 3 and the interposed members 44 and 84 may be provided with lubricating films made of a thermosetting synthetic resin.

What is claimed is:

1. A sliding structure combining two sliding members including a first sliding member and a second sliding member which are held in into sliding contact with each other on sliding surfaces thereof, wherein the sliding surface of the first sliding member is formed of a lubricating film made of a thermosetting synthetic resin, and the sliding surface of the second sliding member is formed of a synthetic resin, the lubricating film being a film of a composition composed of an epoxy resin, a reactive silicone oil with an epoxy group, and a triazinethiol.

2. The sliding structure combining two sliding members according to claim 1, wherein the lubricating film is a film of the composition further containing a curing agent.

3. The sliding structure combining two sliding members according to claim 2, wherein the composition constituting the lubricating film is composed of 100 parts by weight of a sum of the epoxy resin and the curing agent and 2 to 30 parts by weight of a sum of a reactive silicone oil with an epoxy group and the triazinethiol.

4. The sliding structure combining two sliding members according to claim 1, wherein if an epoxy equivalent of the epoxy resin is set to E, a ratio by weight of compounding of the epoxy resin and the curing agent is (epoxy resin):(curing agent)=E: 10 to E: 300.

5. The sliding structure combining two sliding members according to claim 2 wherein a ratio by weight of compounding of the reactive silicone oil with an epoxy group and the triazinethiol is (triazinethiol)/(reactive silicone oil with an epoxy group)=0.03 to 1.

6. The sliding structure combining two sliding members according to claim 1, wherein if a sum of the epoxy resin and the curing agent is set to 100 parts by weight, the composition constituting the lubricating film further contains 2 to 10 parts by weight of a nonreactive silicone oil.

7. The sliding structure combining two sliding members according to claim 1, wherein if the sum of the epoxy resin and the curing agent is set to 100 parts by weight, the composition constituting the lubricating film further contains at least one of 2 to 30 parts by weight of at least one of inorganic and organic filler powders and 0.5 to 5 parts by weight of at least one of oil and a wax-like substance.

8. The sliding structure combining two sliding members according to claim 1, wherein the lubricating film is a film of a composition composed of 100 parts by weight of an epoxy resin, 2 to 30 parts by weight of a reactive silicone oil with an epoxy group, and at least W part by weight of a triazinethiol calculated by the following relation:

$$W = \text{(amount of epoxy resin used 100)} \times \frac{S}{E_1} + \text{[amount of reactive silicone oil with an epoxy group used (from 2 to 30)]} \times \frac{S}{E_2}$$

where $E_1$ is an epoxy equivalent of the epoxy resin used, $E_2$ is an epoxy equivalent of the reactive silicone oil with an epoxy group used, and S is the number of grams of the triazinethiol containing 1 gram-equivalent of mercapto groups —SH.

9. The sliding structure combining two sliding members according to claim 8, wherein the lubricating film is a film of a composition further containing 2 to 10 parts by weight of a nonreactive silicone oil.

10. The sliding structure combining two sliding members according to claim 8, wherein the lubricating film is a film of a composition further containing at least one of 2 to 30 parts by weight of at least one of inorganic and organic filler powders and 0.5 to 5 parts by weight of at least one of oil and a wax-like substance.

11. The sliding structure combining two sliding members according to claim 8, wherein the lubricating film is a film of a composition in which part of W part by weight of the triazinethiol is replaced by a polyamine, an acid anhydride, a phenolic resin, a polyamide resin, or a mercaptan-based compound.

12. The sliding structure combining two sliding members according to claim 1, wherein the synthetic resin constituting the sliding surface of the second sliding member contains at least one kind selected from lubricating oil, grease, wax, molybdenum disulfide, a fluorocarbon resin, a glass powder, a glass fiber, a carbon powder, a carbon fiber, and an aramid fiber.

13. A slide bearing apparatus comprising the sliding structure according to claim 1, which causes sliding to take place during an earthquake so as to exhibit a vibration isolating action.

14. The slide bearing apparatus according to claim 13 wherein the sliding surfaces of the first sliding member and the second sliding member which are held in sliding contact with each other are planar.

15. The slide bearing apparatus according to claim 13 wherein the first sliding member has a concave surface with a circular arc-shaped cross section having a predetermined radius of curvature, and the second sliding member has a convex surface with a circular arc-shaped cross section whose radius of curvature is identical to that of the concave surface with the circular arc-shaped cross section, such that the convex surface is held in sliding contact with the concave surface.

* * * * *

UNITED STATES PATENT AND TRADEMARK OFFICE
CERTIFICATE OF CORRECTION

PATENT NO. : 6,467,961 B2
DATED : October 22, 2002
INVENTOR(S) : Nakamaru et al.

It is certified that error appears in the above-identified patent and that said Letters Patent is hereby corrected as shown below:

<u>Title page,</u>
Item [30], delete the following data:
"Sep. 12, 1997 (JP) ................9-267838."

<u>Column 28,</u>
Lines 11, 20 and 25, change "1" to -- 2 --.

Signed and Sealed this

Fifteenth Day of April, 2003

JAMES E. ROGAN
*Director of the United States Patent and Trademark Office*